United States Patent Office 3,574,172
Patented Apr. 6, 1971

3,574,172
POLY(ALKYLETHER THIOL ANHYDRIDES)
Walter Stamm, Tarrytown, N.Y., assignor to Stauffer Chemical Company, New York, N.Y.
No Drawing. Filed Sept. 18, 1968, Ser. No. 760,679
Int. Cl. C08g 25/00
U.S. Cl. 260—79
5 Claims

ABSTRACT OF THE DISCLOSURE

Novel poly(alkylether thiol anhydrides) are provided having the formula:

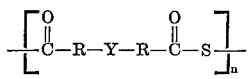

wherein R is a divalent aliphatic hydrocarbon radical consisting essentially of hydrogen and carbon, Y is sulfur or oxygen and $n$ is an integer representing the number of repeating units. Polymer compositions are also provided comprising vinyl type polymers containing the novel thio anhydride compositions of this invention as stabilizers therefore.

---

The present invention relates to novel poly(alkyletherthiolcarboxylic anhydrides) and stable vinyl polymer compositions containing the same.

The novel compositions of this invention are useful as heat stabilizers for vinyl-type resins and are additionally useful as coating materials.

As is well known, the vinyl-type resins, such as polyvinyl chloride, polyvinylidene chloride, polyethylene, polypropylene, vinyl chloride/vinyl acetate copoymer, and the like, require thermal stabilization. This is generally accomplished through the provision of an additive which serves to stabilize the polymer system. Many different types of additives have been proposed for this use, primarily metallic salts, and many of these have served effectively. In certain instances, however, difficulty is encountered in admixing stabilizers to the polymeric system; in others, compatibility problems arise. Invariably, the stabilizing material is leachable from the polymer system, and this can limit its application.

The compositions of the present invention are polymeric in nature and accordingly are highly compatible with polymer systems and are easily admixed therewith. Additionally, since they are polymeric in nature, they are relatively resistant to leaching or volatilization and yet provide effective thermal stabilization.

In accordance with the present invention, a new thermoplastic polymeric composition of matter is provided containing the repeating unit:

FORMULA I

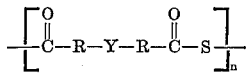

wherein R is a divalent aliphatic hydrocarbon radical consisting essentially of hydrogen and carbon, Y is a chalcogen having a molecular weight of from 14 to 36 inclusive such as sulfur or oxygen, and $n$ is an integer representing the number of repeating units.

Illustrative of the divalent aliphatic groups represented by R above are the divalent alkanes containing from about 1 to about 18 carbon atoms, inclusive, such as methane, ethane, propane, butane, pentane, hexane, heptane, octane, nonane, decane, undecane, dodecane, tridecane, tetradecane, pentadecane, hexadecane, and the like. The alkane base has been employed above to facilitate nomenclature. It is of course understood that the divalency of the alkane base can occur at any positions in the alkane molecule.

In each instance, as defined above, R contains from about 1 to about 18 carbon atoms, and preferably from about 3 to about 12 carbon atoms, inclusive.

The term "hydrocarbon radical consisting essentially of hydrogen and carbon" as used herein is intended to include those radicals containing hydrogen and carbon, but which also can contain or have substituted thereon other moieties such as nitrogen, oxygen and sulfur and the halogens which are inert and non-reactive and do not substantially affect the nature of the polymer.

In Formula I above, it will be appreciated that the illustration is not terminated. These polymers are, in fact of course terminated by either terminating groups such as hydrogen, thiol, halogen, hydroxyl or the like, depending upon the particular techniques employed in the preparation of the polymer as is well known in the art.

In this formula, $n$ represents an integer which indicates the number of repeating units. Again, depending upon reaction conditions, this value can be relatively low, i.e., from about 3 to about 15 or can extend at the high level from about 100 to about 10,000. While it is intended in this invention to include values of from about 3 to about 10,000, it is preferred to employ those polymers having from about 15 to about 1,000 repeating units as these polymers exhibit greater compatibility. Additionally, these polymers exhibit properties generally characteristic of polymers, i.e., capable of forming a film, and thus enjoy a wider variation in utility.

The polymers of this invention can be prepared by reacting a diacyl halide of the formula:

FORMULA II

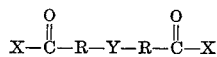

wherein X is a halogen, such as fluorine, chlorine, bromine or iodine, and wherein chlorine is preferred, and wherein R has been previously defined, with hydrogen sulfide. These diacyl halides, chlorides being employed hereinafter as illustrative, are prepared by reacting a corresponding dicarboxylic acid, i.e., wherein X is substituted with OH in Formula II above, in the presence of a typical chemical agent capable of converting the acid to the acyl halide. Typical of such agents are phosphorus trichloride, phosphorus oxychloride, sulfur oxychloride, sulfur dioxychloride, phosphene, and the like. The preparation of these compounds is, however, well known in the art and needs little elaboration here. It is of course appreciated that mixtures of diacyl halides can be employed to prepare polymers containing differing —R— groups.

The particular technique employed in the preparation of the polymers of this invention is dependent to some degree upon the characteristcis of the precursor, diacyl dichloride. If, for example, this compound is a liquid, it can be employed directly and hydrogen sulfide can be bubbled through the liquid; if it is of relatively high molecular weight and solid in nature, it can be dissolved in a suitable solvent and hydrogen sulfide can be again bubbled through it in concentrated or dilute form.

Hydrogen sulfide is reacted with the diacyl dihalide in stoichiometric amounts, i.e., one mole of hydrogen sulfide with one mole of diacyl dihalide, although excesses of hydrogen sulfide can be employed if desired and are preferred.

The reaction is generally conducted at a temperature of from about —60° C. to about 200° C., although preferred temperatures differ widely, depending on the specific preparative method employed.

The reaction can be conducted at atmospheric pressure, superatmospheric pressure, or subatmospheric pressure. It is, however, preferred to conduct the reaction in most instances at atmospheric pressure as this avoids expensive specialized equipment necessary for employing hydrogen sulfide under elevated pressure. When solvents are employed, suitable solvents include aliphatic hydrocarbons, aromatic hydrocarbons, halogenated hydrocarbons, carbon bisulfide, ethers, thioether, ketones, thioketones, nitroparaffins, acylated amines, amides and the like. The solvents employed should, of course, be inert in respect to the reactants and product. It will be appreciated that "interfacial" reaction technique can be employed by using two immiscible solvents.

The reaction proceeds as set forth below:

Formula III

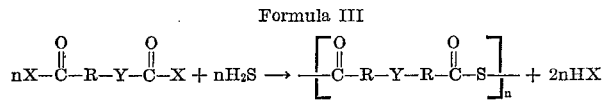

In this reaction, it will be noted that a hydrogen halide HX is given off. To achieve a fast rate of reaction, a high molecular weight and a relatively pure polymeric product, the hydrogen halide should be either removed from the reaction vesel by mechanical means or be bound chemically or physically, or both. The hydrogen halide can be removed continuously or periodically by blowing through the reaction medium with nitrogen or by applying a vacuum to the reaction system. Or it can be bound chemically by employing an acid acceptor, such as sodium carbonate, calcium carbonate, sodium bicarbonate, pyridine or other tertiary amines alone or in mixtures in either stoichiometric or catalytic amounts. Or it can be bound physically by using clays, molecular sieves and the like. Or catalytic amounts of acid acceptors, such as pyridine can be used at elevated temperatures or by blowing inert gases through the reaction medium. However, as indicated, this reaction can be run effectively without such acid acceptors. Also, it will be appreciated that sodium sulfide and other metallic sulfides can be employed in the reaction in place of hydrogen sulfide.

After the reaction has been run, the polymer, i.e. product is recovered, generally as a solid from the reaction medium.

As indicated above, preferred diacyl dihalides employed are the aliphatic diacyl dichlorides. Acids which are particularly useful for preparing these acyl halides are the aliphatic ether dicarboxylic acids, such as the thiodipropionic acid, thiodibutanoic acid, thiodipentanoic acid, thiodihexanoic acid, thiodiheptanoic acid, oxydipentanoic acid, oxydihexanoic acid, oxydiheptanoic acid, oxydioctanoic acid, thiodidecanoic acid, oxydidecanoic acid, thiodidodecanoic acid, thioditetradecanoic acid, oxyditetradecanoic acid, thiodihexadecanoic acid, oxydioctadecanoic acid and the like.

It is, of course, understood that variations within the context of this invention are permissible and are intended to be included herein. For example, polymers can be prepared employing mixtures of diacyl halides to provide variations in polymer units. In certain instances, this can be desirable to provide particular characteristics to the polymer being made.

As indicated earlier, the polymers of this invention are particularly useful as stabilizers for vinyl-type polymers.

By the term "vinyl polymers" is intended polymers containing polymerized vinyl monomers having the structure:

$$>C=C<$$

Such monomers generally contain from about 2 to about 20 carbon atoms, inclusive, and can be illustrated by the following: Lower α-olefin monomers such as ethylene, propylene, butene, and the like; the aromatic vinyl monomers such as styrene, α-methyl styrene, chlorostyrene, and the like; vinyl and vinylidene halides such as vinyl chloride, vinyl fluoride, vinylidene chloride, vinylidene bromide, and the like; vinyl esters such as vinyl formate, vinyl acetate, vinyl propionate, vinyl butyrate, vinyl chloroacetate, vinyl chloropropionate, and the like; acrylic and alpha-alkyl acrylic acids, their amides, and their nitriles such as acrylic acid, chloroacrylic acid, meth- acrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide, N,N-dimethylmethacrylamide, acrylonitrile, chloro-acrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobtuyl vinyl ketone, and the like; N-methyl-N-vinyl acetamide, N-vinyl carbazone, N-vinyl pyrrolidone, ethyl methylene malonate and the like.

The term "vinyl polymers" is intended to include both homopolymers of such vinyl monomers as well as the vinyl copolymers formed by the interpolymerization of two or more of the copolymerized vinyl monomers.

Preferred of the vinyl polymers is polyvinyl chloride and the vinyl chloride copolymers such as vinyl chloride/vinyl acetate copolymer, vinyl chloride/acrylonitrile, copolymer, and the like, as well as the blends of such polymers.

When the polymers of this invention are employed as stabilizers in the vinyl-type polymers, they are generally employed in a stabilizing amount. This is generally of from about 0.1% by weight of the vinyl resin to about 10% by weight, although larger amounts can be employed, if desired. Effective stabilization can generally be achieved from about 0.5% to about 5% by weight of the vinyl polymer.

While the new polymeric compositions of this invention can be used alone in the vinyl resins, other additives can be advanatgeously used in combination with them. Among the well known vinyl stabilizers only the tin-organics phosphites, epoxides and amino acids shall be mentioned here.

In the examples which follow and throughout the specification, all parts and percentages are by weight unless otherwise indicated.

EXAMPLE 1

Poly(thiodipropionoyl sulfide

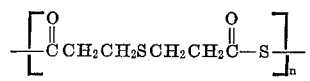

About 300 cc. of pyridine were saturated with hydrogen sulfide at 10° C. Then 24 parts of thiodipropionyl chloride were added to the pyridine solution over a one hour period. During the acid chloride addition, 70 parts of hydrogen sulfide were passed through the pyridine solution over a two hour period. This mixture was acidified with 250 cc. of conc. sulfuric acid in 800 cc. of water. The addition of the acid solution was at such a rate as to keep the reaction temperature below 10° C. The reaction mixture was then filtered, and a yellow, rubbery polymeric material (12 g.) was obtained. Without any further purification the product was analyzed. The I.R. spectrum was in agreement with the proposed structure and the elemental sulfur analysis was just slightly below theory (36.3%).

EXAMPLE II

One hundred parts of commercial polyvinyl chloride resin are thoroughly blended with 20 parts of dioctyl phthalate plasticizer, 0.5 part of stearic acid lubricant and 2.5 parts of the polymeric reaction product of Example I at 90° C. This blend is brought onto a mill having chromium plated rolls operating at a temperature of 165° C. Milling of the fluid film is continued for 30 minutes at 165° C., during which time the vinyl resin remains substantially colorless. At room temperature the resulting PVC film is fairly stiff, colorless and clear. It is useful in many applications, including the manufacture of packaging material.

What is claimed is:

1. A poly(alkylether thiolcarboxylic anhydride) having the structure:

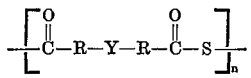

wherein R is a divalent aliphatic hydrocarbon radical consisting essentially of hydrogen and carbon and containing from about 1 to about 12 carbon atoms inclusive, Y is a chalcogen selected from the group consisting of sulfur and oxygen, and $n$ is an integer having a value of from about 3 to about 10,000.

2. The composition of claim 1, wherein $n$ is an integer having a value from about 15 to about 1,000.

3. The composition of claim 1, wherein R is an ethylene group.

4. The composition of claim 1, wherein Y is sulfur.

5. The composition of claim 1, wherein Y is oxygen.

References Cited

UNITED STATES PATENTS

| | | | |
|---|---|---|---|
| 3,254,061 | 5/1966 | Martin et al. | 260—779 |
| 3,278,352 | 10/1966 | Erickson | 149—19 |
| 3,386,958 | 6/1968 | Remes et al. | 260—67 |
| 3,415,764 | 12/1968 | Erickson | 260—2.5 |

DONALD E. CZAJA, Primary Examiner

M. I. MARQUIS, Assistant Examiner

U.S. Cl. X.R.

260—45.7, 79.1, 609, 897, 899

PO-1050
(5/69)

UNITED STATES PATENT OFFICE
CERTIFICATE OF CORRECTION

Patent No. 3,574,172            Dated    April 6, 1971

Inventor(s)        Walter Stamm

It is certified that error appears in the above-identified patent and that said Letters Patent are hereby corrected as shown below:

Column 1, line 34, "copymer" should read --copolymer--
Column 1, line 61, "36" should read --35--, Column 4, line 13, change "isobtuyl" to read --isobutyl-- , Column 4, line 23, omit comma after "acrylonitrile", Column 4, Example 1, first line, after "sulfide" close parenthesis.

Signed and sealed this 24th day of August 1971.

(SEAL)
Attest:

EDWARD M. FLETCHER, JR.            WILLIAM E. SCHUYLER, JR.
Attesting Officer                   Commissioner of Patents